United States Patent Office 3,294,761
Patented Dec. 27, 1966

3,294,761
ORGANO-METAL POLYMERS
Paul F. Warner, Phillips, Tex., assignor to Phillips Petroleum Company, a corporation of Delaware
No Drawing. Filed Aug. 26, 1963, Ser. No. 304,635
9 Claims. (Cl. 260—79)

This invention relates to new polymeric compositions. More particularly, this invention relates to novel organometal polymers derived from bivalent metal salts and dimercaptans. In another aspect, this invention relates to novel metal-organo polymers exhibiting excellent water repellent properties. In another aspect, this invention relates to a process for producing novel metal-organo polymers.

It is known that for many purposes cloth materials to be useful must be water repellent. It is desirable to impart this property to the cloth without otherwise altering its physical characteristics. In addition, where cloth is to be exposed to the elements it is desirable that it be capable of resisting the action of fungi which otherwise would cause the ultimate breakdown of the cloth fibers.

In accordance with my invention, I have now discovered a novel type of metal-organic polymer which is useful for the impregnation of cloth materials to render the materials water repellent. In addition, I have found that certain of these novel metal-organic polymers not only are useful for rendering the cloth water repellent but also are effective fungicides.

Accordingly, it is an object of the invention to provide a novel class of metal-organic polymers.

Another object of the invention is to provide metalorganic polymers which exhibit fungicidal properties.

Other objects, advantages and features of the invention will be readily apparent to those skilled in the art from the following discussion and the appended claims.

The metal-organic polymers are composed of repeating units represented by the formula:

—(Me—S—R—S—Me—S—R—S)— wherein Me is a metal selected from the group consisting of zinc, cadmium, mercury, lead, antimony, bismuth, cobalt, nickel and tin, and R is selected from the group consisting of from 2 to 20 carbon alkylenes, thiaalkylenes, oxaalkylenes, and cycloalkylene alkyls.

Dithiols which are suitable for use in accordance with the invention for supplying the organo portion (R) of the metal-organic polymers include:

2,9-p-menthane dithiol
the vinylcyclohexene dithiols
bis(3-mercaptopropyl) sulfide
bis(3-mercaptopropyl) ether
1,2-dimercapto ethane and
1,2-dimercapto propane In addition the sulfides of the above dithiols can be employed as well as polysulfide polymers, as long as there are terminal thiol groups.

The theoretical reaction for forming the polymer is illustrated as follows:

2X Me(CH₃COO)₂+2X HS—R—SH→HOOCCH₂
—(MeS—R—S—Me—SRS)ₓH+4X—1 CH₃COOH wherein Me and R are as previously defined.

When the SH compound, HS—R—SH, is used in excess in the above reaction, the resulting polymer has the formula

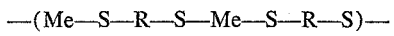

In addition, mixtures of the above polymers can be present.

Generally, any bivalent metal salt which is capable of reacting with the dimercaptan is suitable for use in the above-illustrated reaction. Such metal salts include cadmium acetate, zinc acetate, mercuric acetate, lead acetate, cadmium chloride, zinc chloride, mercuric chloride, lead chloride, as well as the acetates and chlorides of antimony, bismuth, cobalt, nickel and tin.

In addition to the acetates and chlorides, other anions which can be employed are the formates, propionates, bromides, iodides, fluorides, sulfates and chromates. The only limitations on the salt to be used is that it be soluble in either water or other solvent. Preferred for carrying out the process of the invention are the acetate salts due to their solubility in methanol and their freedom from the formation of complex sulfonium salts by the acetic acid liberated, in contrast to the strong mineral acids.

Generally, the reaction is conducted in a solvent for both the metal salt and the mercaptan, preferably an alkanol such as methanol. Where the solvent employed is a solvent for only one of the reactants, best results are achieved where the bivalent metal salts are soluble in the reaction medium.

While the reaction is quite rapid at room temperature, the reactin can be conducted at temperatures in the range of 50° to 200° F. and at a pressure ranging from 0 to 20 p.s.i.g. Preferably the reaction is carried out at a temperature of 80° to 100° F. and 0 p.s.i.g. pressure.

The following example will further serve to illustrate the invention. It is not intended that the invention should be limited thereto.

Example

A metal-organic type polymer was prepared by mixing the following:

| | Grams | Mols |
|---|---|---|
| 2,9-p-menthane dithiol | 20.4 | 0.1 |
| Cd(CH₃COO)₂.2H₂O | 26.6 | 0.1 |
| Menthanol | 260.0 | |

The resulting mixture was agitated at room temperature and pressure, allowed to stand overnight, then filtered to recover the polymer. An amount of 34.5 grams (31.5 g. stoichiometric) was recovered as an air-dried powder from the mixture. No polymer or cadmium salt was left in the filtrate, as shown by evaporation to dryness.

The recovered polymer was a brilliant white fluffy powder exhibiting extreme water repellency. The polymer did not melt on heating but decomposed between 600° and 800° F.

The polymer was insoluble in water, methanol, benzene, dimethyl sulfoxide and acetone.

Polymers in accordance with this invention exhibit a great ability to repel water and thus are highly useful as impregnants for cloth wherein water repellence is desired. Impregnation is achieved by forming in place the polymer in methanol in the presence of the cloth or fiber to be coated. The extent of impregnation is controlled by varying the soaking time. Particularly suitable is cotton cloth, although coatings to wool and synthetic fabrics are contemplated within the scope of the invention.

The zinc polymers of the invention, in addition to being water repellents, exhibit fungicidal properties and are thus highly suitable for use where both properties are desirably imparted to the materials such as used in the manufacture of tents to prevent the materials from rotting.

Various modifications of this invention can be made or followed without departing from the spirit or scope thereof.

I claim:
1. A novel solid metal containing polymeric composition produced by the process consisting of reacting a dithiol selected from the group consisting of 2,9-p-menthane dithiol vinylcyclohexene dithiol, bis(3-mercaptopropyl)sulfide, bis(3-mercaptopropyl)ether, 1,2-dimercapto ethane and 1,2-dimercapto propane with a soluble bivalent metal salt selected from those of the formula Me X wherein Me is a metal selected from the group consisting of zinc, cadmium, mercury, lead, cobalt, nickel and tin, and X is an anion selected from the group consisting of acetate, chloride, formate, propionate, bromide, iodide, fluoride, and sulfate at a temperature in the range of from 50° F. to 200° F. and a pressure in the range of 0 to 20 p.s.i.g., and thereafter recovering the insoluble solid polymer as a product of the process.

2. A composition according to claim 1 wherein the dithiol is 2,9-p-menthane dithiol and the soluble bivalent metal salt is cadmium acetate.

3. A composition according to claim 1 wherein said dithiol is vinylcyclohexene dithiol.

4. A composition according to claim 1 wherein said dithiol is bis(3-mercaptopropyl)sulfide.

5. A composition according to claim 1 wherein said dithiol is bis(3-mercaptopropyl)ether.

6. A composition according to claim 1 wherein said dithiol is 1,2-dimercapto ethane.

7. A composition according to claim 1 wherein said dithiol is 1,2-dimercapto propane.

8. As a novel composition of matter, a fabric material having impregnated thereon a metal containing polymeric composition produced by the process consisting of reacting a dithiol selected from the group consisting of 2,9-p-menthane dithiol, vinylcyclohexene dithiol, bis(3-mercaptopropyl)sulfide, bis(3-mercaptopropyl)ether, 1,2-dimercapto ethane and 1,2-dimercapto propane with a soluble bivalent metal salt selected from those of the formula Me X wherein Me is a metal selected from the group consisting of zinc, cadmium, mercury, lead, cobalt, nickel and tin, and X is an anion selected from the group consisting of acetate, chloride, formate, propionate, bromide, iodide, fluoride, and sulfate at a temperature in the range of from 50° F. to 200° F. and a pressure in the range of 0 to 20 p.s.i.g., and thereafter recovering the insoluble solid polymer as a product of the process.

9. The composition of claim 8 wherein Me is zinc and said fabric is cotton.

References Cited by the Examiner
UNITED STATES PATENTS

| | | | |
|---|---|---|---|
| 2,195,380 | 3/1940 | Patrick | 260—79.1 |
| 2,466,963 | 4/1949 | Patrick | 260—79.1 |
| 2,470,529 | 5/1949 | Stewart | 260—79.1 |
| 2,584,264 | 2/1952 | Foulks | 260—79.1 |
| 2,964,503 | 12/1960 | Carpenter et al. | 260—79.1 |
| 3,136,740 | 6/1964 | Klemshuk et al. | 260—609 |

LEON J. BERCOVITZ, *Primary Examiner.*

M. I. MARQUIS, *Assistant Examiner.*